Nov. 21, 1950 — L. J. LINDE — 2,531,140
TRAILER VEHICLE FOR HOT LINE TOOLS
Filed Feb. 13, 1948 — 2 Sheets-Sheet 1

Inventor
Leonard J. Linde
BY
R. H. Wendt
Attorney

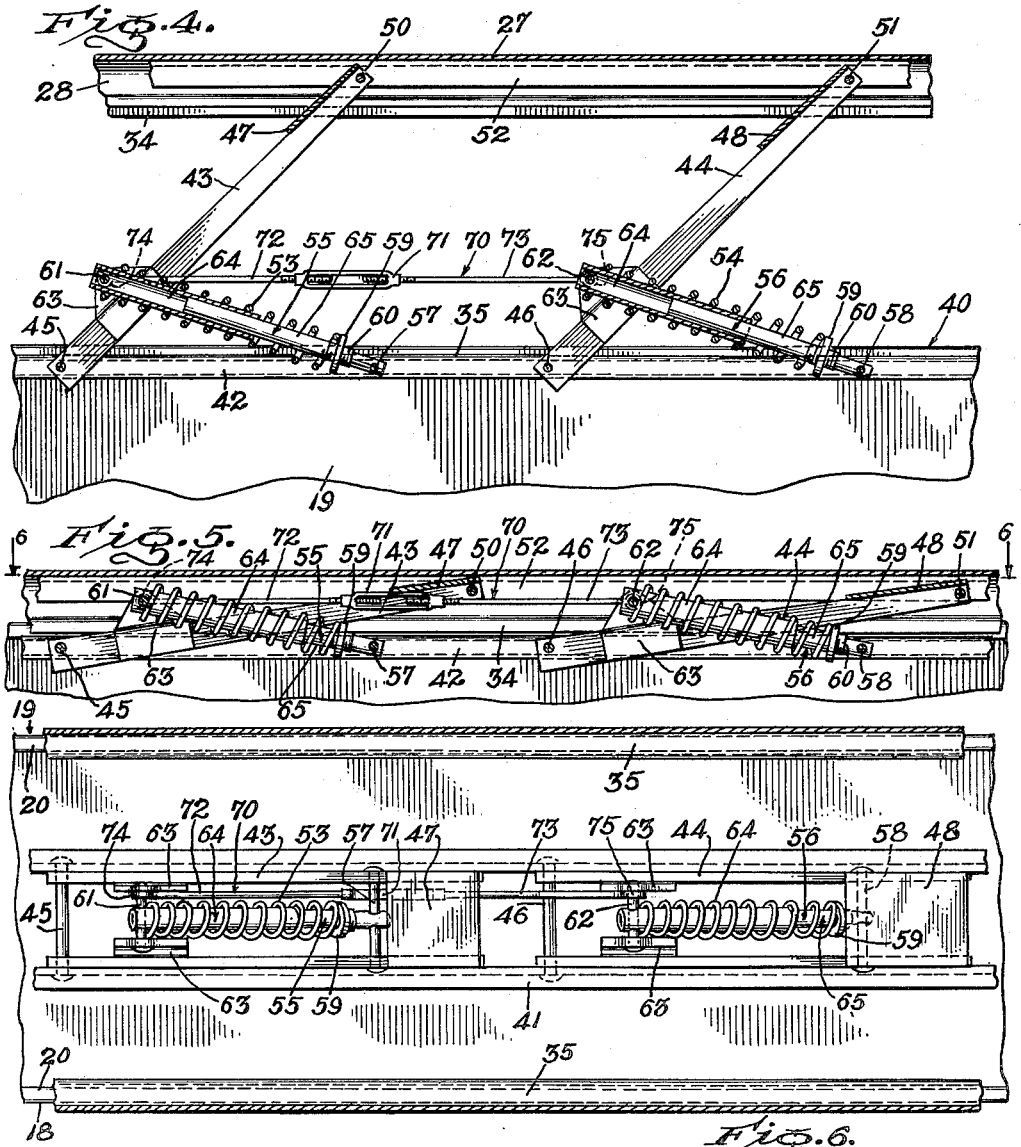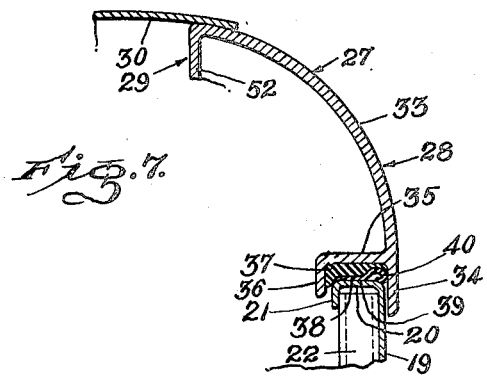

Patented Nov. 21, 1950

2,531,140

UNITED STATES PATENT OFFICE 2,531,140

TRAILER VEHICLE FOR HOT LINE TOOLS

Leonard J. Linde, Centralia, Mo., assignor to A. B. Chance Company, Centralia, Mo., a corporation of Missouri Application February 13, 1948, Serial No. 8,261

8 Claims. (Cl. 296—100)

The present invention relates to trailer vehicles for hot line tools, and is particularly concerned with the provision of an improved trailer vehicle which is adapted to maintain in a dry and high insulating condition, the wooden poles and other tools which are utilized in manipulating and operating upon energized transmission lines and the like.

One of the objects of the invention is the provision of an improved trailer vehicle for enclosing and protecting such tools, which is provided with a one-piece movable top adapted to shield effectively the interior of the trailer from rain, snow or splashed water and which will not lose this characteristic with age, due to the aging of gaskets or pads.

Another object of the invention is the provision of an improved tool trailer, which is provided with a top that can be opened without spilling accumulated snow or water into the interior of the trailer.

Another object of the invention is the provision of an improved counterbalanced top that can be opened by one man, and which when opened offers an unobstructed view and accessibility to all of the trailer contents, while the top is still in position to protect the contents from rain or the like.

Another object is the provision of a top lifting and lowering mechanism for a tool holding trailer, which requires a minimum amount of space and thus permits practically the entire space inside the trailer to be used for storage of equipment.

Another object of the invention is the provision of an improved spring biased mechanism in which the full spring force is utilized to hold the top in raised position, and in which the gravity effect of the weight of the top increases as the top is lowered until in its fully lowered position the weight of the top exceeds the force of the spring to maintain the top in the closed position.

Another object is the provision of an improved operating mechanism comprising a parallelogram linkage which is provided with means for adjusting and maintaining its stability, and for maintaining the parallelism of the cover and body of the trailer, particularly when the cover is near the closed position, such as an adjustable drag link which is pivoted to each of the lift arms adjacent its lower end.

Another object is the provision of an improved trailer vehicle for hot line tools, which is provided with a suitable cover from which hinges have been eliminated because the hinges invariably cause leaking of the top when it is closed in spite of the use of gaskets, troughs and guards, and the provision of a trailer which has a water and air-tight closure that will not leak or cause the tools to be splashed with water when the cover is closed and the trailer is in motion.

Other objects and advantages of the invention will be apparent from the following description and the accompanying drawings, in which similar characters of reference indicate similar parts throughout the several views.

Referring to the two sheets of drawings accompanying this specification,

Fig. 4 is a fragmentary side elevational view taken on the plane of the line 4—4 of Figure 3, looking in the direction of the arrows and showing the elements of the top supporting mechanism in open position;

Fig. 5 is a similar fragmentary sectional view taken on the same plane, with the top shown in the closed position;

Fig. 6 is a fragmentary top plan view of the mechanism in the position of Figure 5; and Fig. 7 is a fragmentary vertical sectional view, showing the structure of the edge of the top and that of the body panel which the top engages.

Figure 1:
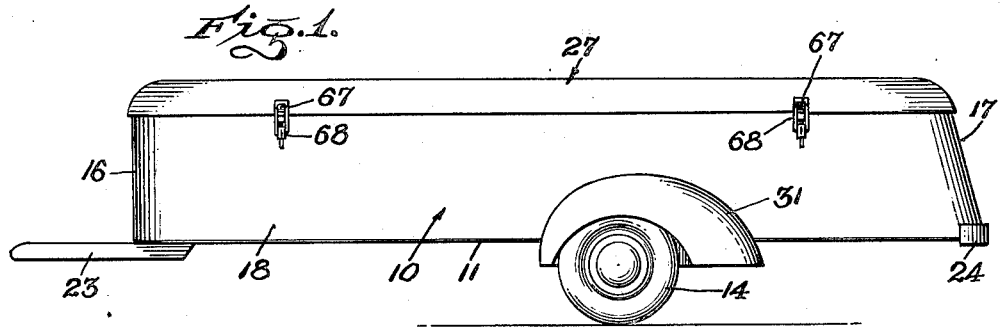
Fig. 1 is a side elevational view of the tool trailer vehicle with its top in closed position.

Referring to Figures 1 to 3, 10 indicates the tool trailer vehicle in its entirety, and the vehicle preferably includes a suitable chassis comprising a rectangular lower frame 11 covered with the bottom of the vehicle, and provided with suitable supports 12 for supporting the axle 13 carrying the two rubber tired wheels 14 and 15.

The chassis 11 supports the body panels which form the front wall 16, rear wall 17 and the two side walls 18 and 19 of the trailer, and the panels 16—19 are preferably formed at their upper edges with a horizontal top flange 20 terminating in a depending inner flange 21 so that each panel has an integral channel at its top for engagement with the cover, and for reenforcing the body panels.

The panels may be additionally re-enforced by vertically extending channeled members 22 (Figure 7) welded to the panels and to the chassis frame 11. The side panels 18 and 19 preferably support wheel fenders 31, 32, covering the upper part of the wheels 14 and 15 to limit splashing of mud and water by the wheels.

The chassis preferably supports a tongue 23 at its forward end and a bumper 24 at its rear end, and the rear wall 17 preferably slopes upwardly and forwardly and is provided with a hinged door 25, by means of which access may be had to small tools which are preferably located adjacent the opening 26 for the hinged door 25.

The trailer body, formed by the wall panels 16—19 and bottom wall, is open at the top, the open top being indicated at 26 and adapted to be closed by a top cover 27. Top cover 27 preferably consists of a rectangular metal frame 28 formed of extruded metal members of the shape shown in Figure 7, and having a central rectangular opening 29 (Figure 7) which is closed by a curved top panel 30.

The top panel 30 is upwardly convex and downwardly concave, and sufficiently so to insure the drainage of water from the top panel 30 on the top frame 28 which the top panel overlaps and to which it is welded. The extruded metal members, of which the frame 28 is constructed, preferably have their bodies formed on a relatively large radius 33.

The body 33 supports at its lower edge a depending flange 34 which overlaps the side panels 16—19, and the body 33 of frame member 28 also supports a horizontal flange 35 which terminates in a depending flange 36 on the inside of the top opening 26. The flanges 34—36 form a channeled member adapted to extend over the top edge of the body panels, the outer flange 34 depending sufficiently so that the juncture between the top and the side panels is protected from the weather.

The channel formed by the flanges 34—36 may be provided with a sponge rubber gasket 37 fitting in the channel and of substantially rectangular shape. The sponge rubber gasket 37 is cemented in place, and on its lower side preferably carries a dust and moisture seal 38 consisting of a rubber member, having a horizontal attaching flange 39 and a tubular portion 40 located adjacent the outer depending flange 34.

Tubular portion 40 of the seal flattens out somewhat when engaged with the body panels, and with the sponge rubber gasket 37 provides a substantially air-tight seal over all the juncture between the top and the body panels of the vehicle.

The end panels 16 and 17 support a pair of longitudinally extending channeled frame members 41, 42 (Figure 3) which have their ends welded or otherwise secured to the top channel portions of the end panels 16 and 17. The frame members 41 and 42, extending longitudinally of the top opening 26, are adapted to support the top raising and lowering mechanism as follows:

Two pairs of pivoted levers 43 and 44 are pivotally mounted on the longitudinal frame members 41 and 42 by rivets or bolts 45, 46, respectively, as shown in Figure 4. These pivoted levers have lower ends so located that the levers may extend longitudinally of the top opening 26 when the top 27 is down, the levers being located inside the trailer. Thus the two pivoted levers 43 are pivoted at 45 adjacent the front panel 16, and the pivoted levers 44 are pivoted at 46 adjacent the middle of the vehicle so that there is room for both of these pairs of levers to move downward into the top opening 26.

The single pivot bolt 45 or 46 may extend from frame member 41 to frame member 42 in each case, serving to pivot both of the levers of the pair. At their upper ends the pairs of levers 43, 44 are preferably joined by a re-enforcing plate 47, 48 welded to the levers to increase their rigidity. At their upper ends each pair of levers is pivotally mounted on the top 27 by means of a bolt or rivet 50, 51, which passes through both levers of the pair and also passes through the depending flange 52 of the extruded top frame members 28.

The location of the pivots 50 and 51 on the top 27 is such that when the top is down, in the position of Figure 1, the lever pairs 43, 44 may lie substantially horizontally under the cover, and the cover is brought into longitudinal registry with the tops of the end panels.

Figure 3:
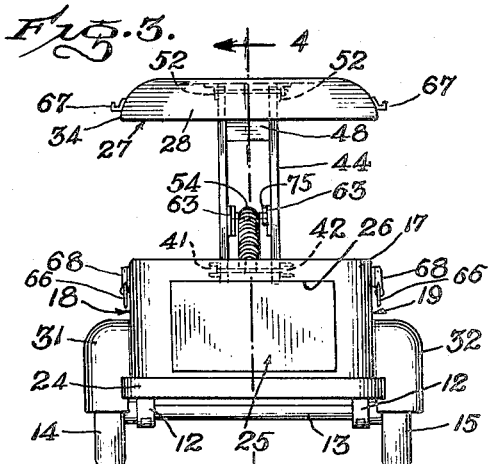
Fig. 3 is a rear elevational view with the top in the open position.

In order to support the weight of the cover in elevated position and to assist in its elevation, the mechanism is preferably provided with compression springs 53, 54 carried by tubular spring guides 55 and 56. Each of the tubular spring guides 55, 56 is pivotally mounted by means of a through bolt or rivet 57, 58 on the longitudinal frame members 41, 42, the spring guides 55, 56 being located midway between the frame members 41, 42, as seen in Figure 3.

The spring guides 55, 56 are each threaded at their lower ends, and provided with a threaded collar 59 against which the springs 53 and 54 react. The collar 59 may be moved longitudinally of each spring guide 55, 56 on the threads 60 to adjust the spring compression.

At its upper end, each of the spring guides 55, 56 is pivotally mounted on the pairs of levers 43, 44, by means of bolts or rivets 61, 62 which also pass through flanged plates 63 welded or otherwise secured to the pairs of levers 43, 44 to provide bearings for the bolts 61, 62. The upper end of each spring 53, 54 acts against the pintle or bolt 61, 62 in each case.

Each spring guide 55, 56, consists of a pair of tubular members 64, 65, telescoping into each other, as shown in Figure 4, so that the spring guides 55, 56 become longer as the top goes upward and become shorter as the top comes downward, compressing the springs 53, 54.

*Operation*

The moment arm, at which the springs 53, 54 act on the levers 43, 44, is measured by a line extending from the pintle 45 to the axis of the guide 55 and at right angles to the latter. Thus it will be seen that this moment arm is at its maximum with the top in the open position of Figure 4, so that the springs exert a maximum force in that position to hold the top up in the open position.

As the top is moved downward to the position of Figure 5 the length of this moment arm decreases, and the force exerted by the spring on the cover or top through the levers 43, 44 also decreases until in the closed position of Figure 5 the springs are acting at a moment arm which is very close to the pintles 45, and the effect of the weight of the hood has increased until the weight of the top is sufficient to hold it shut.

As the top is lifted the effect of its weight is constantly decreasing, and the effect of the springs acting on the levers to lift the top is constantly increasing so that in the position of Figure 4 the springs are adapted to hold the top open. The embodiments chosen to illustrate the invention show two springs, but the number of springs may be altered to suit the size of the trailer, and in some embodiments it will only be necessary to provide a single adjustable collar 59 to accomplish sufficient adjustment of the spring tension in that particular case.

Figure 2:
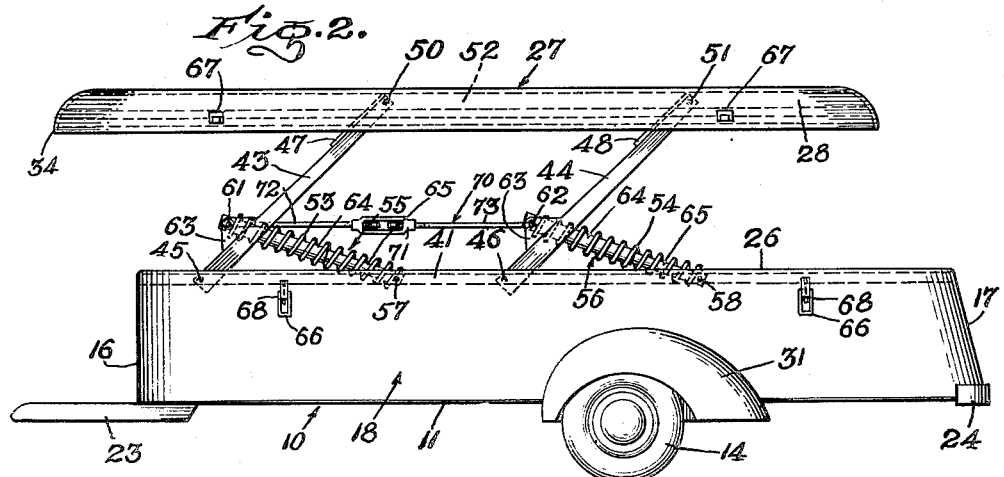
Fig. 2 is a similar view with the top in open position.

The operating mechanism is preferably provided with a drag link 70, Figures 2 and 4, which may consist of a pair of eye rods 72, 73, provided with the eyes 74, 75 at each end. The eyes 74, 75 are pivoted on the operating arms 43, 44 by means of the same bolts 61, 62 which provide for the pivotal attachment of the spring guides 55, 56.

The threaded ends of the eye rods 72, 73 are joined by a turn buckle 71, by means of which the length of the drag link may be adjusted. The drag link extends from one lift arm 43 to the other 44 at an angle to the lift arms and acts to stabilize the four-bar linkage to maintain its parallelism and to keep the body and cover in parallelism, particularly when the cover approaches the closed position. By means of the turn buckle 71 the lift arms 43, 44 may be drawn toward each other and maintained with a tension or a compression maintained on the drag link so as to take care of any looseness in any of the bearings and to prevent rattling in spite of the wear that may occur in service.

The side panels are preferably provided with pivoted clips 66 (Figure 2) which may be hooked over keepers 67, carried by the top 27, so that the top can be pulled down tightly and locked. The clip assembly has its body 68 provided with suitable apertures for receiving a padlock, so that the clips 66 may be locked in the closed position to prevent unlatching by unauthorized persons.

The interior of the trailer vehicle is provided with suitable padded racks designed to support the wood poles without abrasion of the wood or the varnish. The interior of the trailer is also provided with an electrical heating unit, which may be energized from an outside 110 volt source while the vehicle is parked in a garage or storage shed.

The heating unit may be energized while driving, from the battery of the automobile which is pulling the trailer, and the heating unit circuit provided with a suitable thermostat cutting out the heat at a predetermined temperature to prevent overheating, excessively rapid drying or damage to the finish by heat. Thus the tools and poles in the trailer may be maintained in a dry and high insulating condition at all times, so that it will be safe to use them on transmission lines energized with high tension voltage.

It will thus be observed that I have invented an improved trailer vehicle for hot line tools, in which the cover is so supported by mechanism that it may be moved from the opened to the closed position by one man by merely lifting on the cover, although the cover is of considerable weight and area. Even in the open position the cover is supported above the open top of the trailer to protect the contents from becoming wet by rain or other adverse weather conditions, and when closed the juncture between the cover and the body of the trailer is effectively sealed against passage of moisture of any kind.

The mechanism for supporting the cover occupies a minimum amount of space, thus leaving most of the space in the trailer for storage of tools, and the force exerted by the springs which counterbalance the cover can be adjusted as desired.

The mechanism for supporting, lowering and raising the cover is simple and may be manufactured at a low cost, yet it may be used for a long period of time without necessity for repair or replacement of any of its parts.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a tool container, the combination of a box-like metal container open at its top, with a pair of frame members extending from end to end of said container, two pairs of levers pivotally mounted at their lower ends on said frame members, said levers being pivotally mounted at their upper ends upon a cover for said open top, a compression spring mounted upon a telescoping spring guide, said guide being pivoted at its lower end to said frame members and at its upper end to said levers, whereby the lowering of the cover compresses the spring and the spring is expanded to aid in the lifting of the cover, the pivot of said spring guide on said lever being located adjacent the lower pivot of said lever, whereby the moment arm at which the spring acts on the lever increases as the top is raised until the moment exerted by the spring is sufficient to hold the cover in elevated position.

2. In a tool container, the combination of a box-like metal container open at its top, with a pair of frame members extending from end to end of said container, two pairs of levers pivotally mounted at their lower ends on said frame members, said levers being pivotally mounted at their upper ends upon a cover for said open top, a compression spring mounted upon a telescoping spring guide, said guide being pivoted at its lower end to said frame members and at its upper end to said levers, whereby the lowering of the cover compresses the spring and the spring is expanded to aid in the lifting of the cover, the pivot of said spring guide on said lever being located adjacent the lower pivot of said lever, whereby the moment arm at which the spring acts on the lever increases as the top is raised until the moment exerted by the spring is sufficient to hold the cover in elevated position, the said spring guide having its lower end threaded and provided with a threaded collar for engaging the spring, whereby the spring compression can be initially adjusted so that in its expanded final position the spring exerts sufficient force to hold the cover elevated.

3. In a trailer vehicle for housing hot line tools, the combination of a box-like container open at the top, with a pair of longitudinally extending frame members extending across the central portion of the open top of said container, leaving the top unobstructed adjacent each side wall, a top cover for said container, said top cover being carried by a pair of upwardly extending pivoted levers pivoted to the top cover at their upper ends and pivoted to said frame members at their lower ends, and spring means acting between said frame members and at least one of said levers for urging the top cover into an elevated position, said spring means extending substantially horizontally when the top cover is closed, and acting on said lever at a point above its lower pivot whereby the moment arm at which the spring means acts is increased as the top rises until the spring means is adapted to hold the top in open position, said spring means comprising a compression spring mounted upon a telescoping spring guide, the ends of which are pivoted to said frame members and to said lever.

4. In a trailer vehicle for housing hot line tools, the combination of a box-like container open at the top, with a pair of longitudinally extending frame members extending across the central portion of the open top of said container, leaving the top unobstructed adjacent each side wall, a top cover for said container, said top cover being carried by a pair of upwardly extending pivoted levers pivoted to the top cover at their upper ends and pivoted to said frame members at their lower ends, and spring means acting between said frame members and at least one of said levers for urging the top cover into an elevated position, said spring means extending substantially horizontally when the top cover is closed, and acting on said lever at a point above its lower pivot whereby the moment arm at which the spring means acts is increased as the top rises until the spring means is adapted to hold the top in open position, said spring means comprising a compression spring mounted upon a telescoping spring guide, the ends of which are pivoted to said frame members and to said lever, said spring guide having a threaded portion supporting an adjustable spring abutment collar whereby the initial compression of the spring may be adjusted to the desired amount to counterbalance the cover.

5. In a trailer vehicle for hot line tools, the combination of a moisture-tight metal box-like body which is open at its top and which is elongated from front to rear to receive long operating poles for hot line tools, the said container being provided longitudinally of the center of its open top with a pair of longitudinally extending frame members carried by the container, a top cover closing the open top and overlapping and depending below the upper edges of the side walls for drainage, the said top being provided with a pair of longitudinally extending frame members centrally located above said frame members in the container, a parallelogram linkage connecting the cover and the container, said linkage consisting of a pair of front links rigidly joined together and a pair of rear links rigidly joined together, these pairs being pivotally mounted on the frame members of the container and on the frame members of the cover, to lie in substantially horizontal position when the cover is closed, and compression spring means acting between the frame members of the container and one of said links, adjacent the lower pivot of said link so that the compression spring means is compressed to substantially horizontal position when the cover is closed, in which position the spring means acts at a minimum moment arm on the link so that its strength is insufficient to lift the cover, which remains closed by gravity, but as the cover is elevated by hand, the moment arm at which the spring means acts on the link increases until the compression spring means holds the cover in elevated position.

6. In a trailer vehicle for hot line tools, the combination of a moisture-tight metal box-like body which is open at its top and which is elongated from front to rear to receive long operating poles for hot line tools, the said container being provided longitudinally of the center of its open top with a pair of longitudinally extending frame members carried by the container, a top cover closing the open top and overlapping and depending below the upper edges of the side walls for drainage, the said top being provided with a pair of longitudinally extending frame members centrally located above said frame members in the container, a parallelogram linkage connecting the cover and the container, said linkage consisting of a pair of front links rigidly joined together and a pair of rear links rigidly joined together, these pairs being pivotally mounted on the frame members of the container and on the frame members of the cover, to lie in substantially horizontal position when the cover is closed, and compression spring means acting between the frame members of the container and one of said links, adjacent the lower pivot of said link so that the compression spring means is compressed to substantially horizontal position when the cover is closed, in which position the spring means acts at a minimum moment arm on the link so that its strength is insufficient to lift the cover, which remains closed by gravity, but as the cover is elevated by hand, the moment arm at which the spring means acts on the link increases until the compression spring means holds the cover in elevated position, said compression spring means comprising a pair of telescoping guides inside a helical spring.

7. In a trailer vehicle for hot line tools, the combination of a moisture-tight metal box-like body which is open at its top and which is elongated from front to rear to receive long operating poles for hot line tools, the said container being provided longitudinally of the center of its open top with a pair of longitudinally extending frame members carried by the container, a top cover closing the open top and overlapping and depending below the upper edges of the side walls for drainage, the said top being provided with a pair of longitudinally extending frame members centrally located above said frame members in the container, a parallelogram linkage connecting the cover and the container, said linkage consisting of a pair of front links rigidly joined together and a pair of rear links rigidly joined together, these pairs being pivotally mounted on the frame members of the container and on the frame members of the cover, to lie in substantially horizontal position when the cover is closed, and compression spring means acting between the frame members of the container and one of said links, adjacent the lower pivot of said link so that the compression spring means is compressed to substantially horizontal position when the cover is closed, in which position the spring means acts at a minimum moment arm on the link so that its strength is insufficient to lift the cover, which remains closed by gravity, but as the cover is elevated by hand, the moment arm at which the spring means acts on the link increases until the compression spring means holds the cover in elevated position, said compression spring means comprising a pair of telescoping guides inside a helical spring, and said telescoping guides being pivotally connected, one to the container and the other to the link.

8. In a trailer vehicle for hot line tools, the combination of a moisture-tight metal box-like container which is open at its top and which is elongated from front to rear to receive long operating poles for hot line tools, the said container being provided longitudinally of the center of its open top with a pair of longitudinally extending container frame members carried by the container, a top cover closing the open top and overlapping and depending below the upper edges of the side walls for drainage, the said top being provided with a pair of longitudinally extending cover frame members centrally located above said container frame members, a parallelogram linkage connecting the cover and the container, said linkage consisting of a pair of front links rigidly joined together and a pair of rear links rigidly joined together, these pairs being pivotally mounted on the frame members of the container and on the frame members of the cover, to lie in substantially horizontal position when the cover is closed, and compression spring means acting between the frame members of the container and each of said links, adjacent the lower pivot of each link so that the compression spring means is compressed to substantially horizontal position when the cover is closed, in which position the spring means acts with a minimum moment arm on the link so that its strength is insufficient to lift the cover, which remains closed by gravity, but as the cover is elevated by hand, the moment arm at which the spring means acts on the links increases until the compression spring means holds the cover in elevated position, said compression spring means comprising a pair of telescoping guides inside a helical spring, and said telescoping guides being pivotally connected, one to the container and the other to the link, the points of pivot of said telescoping guides to the links being joined by a rod pivotally connected to these points and provided with a turnbuckle to increase or decrease its length to draw all of the parts together and take up the looseness in the points of pivot and to increase the stability of the mechanism.

LEONARD J. LINDE.

REFERENCES CITED

The following references are of record in the file of this patent:

UNITED STATES PATENTS

| Number | Name | Date |
|---|---|---|
| 320,332 | Cannon et al. | June 16, 1885 |
| 1,474,283 | Nystrom et al. | Nov. 13, 1923 |
| 1,481,543 | Eke | Jan. 22, 1924 |
| 2,132,464 | Francis | Oct. 11, 1938 |
| 2,168,661 | Anderson et al. | Aug. 8, 1939 |
| 2,344,551 | Heinrich | Mar. 21, 1944 |
| 2,385,115 | Stuart | Sept. 18, 1945 |

FOREIGN PATENTS

| Number | Country | Date |
|---|---|---|
| 5,035 | Great Britain | Jan. 20, 1886 |
| 461,624 | Great Britain | Feb. 19, 1937 |
| 463,825 | Great Britain | Apr. 7, 1937 |